United States Patent [19]
Kiley

[11] 3,777,724
[45] Dec. 11, 1973

[54] INTERNAL COMBUSTION ENGINE HAVING A VARIABLE VOLUME PRECOMBUSTION CHAMBER

[75] Inventor: Leo R. Kiley, Grosse Pointe Woods, Mich.

[73] Assignee: Teledyne Industries, Inc., Los Angeles, Calif.

[22] Filed: Nov. 3, 1971

[21] Appl. No.: 195,111

[52] U.S. Cl............ 123/78 B, 123/32 B, 123/32 C, 123/191 S
[51] Int. Cl...................... F02b 75/04, F02b 23/00
[58] Field of Search...................... 123/191 S, 32 B, 123/32 C, 78 B, 78 R

[56] References Cited
UNITED STATES PATENTS

| | | | |
|---|---|---|---|
| 2,190,537 | 2/1940 | Wiebicke | 123/32 B |
| 2,256,776 | 9/1941 | Kammer | 123/32 B |
| 2,983,268 | 5/1961 | Heintz | 123/32 B |
| 3,200,798 | 8/1965 | Mansfield | 123/78 B X |
| 3,543,735 | 12/1970 | Kruckenberg | 123/32 B |
| 2,107,792 | 2/1938 | Huesby | 123/32 B |
| 2,827,883 | 3/1958 | Goede | 123/32 C |
| 3,583,372 | 6/1971 | Hoffmann | 123/32 C |

*Primary Examiner*—Wendell E. Burns
*Attorney*—Robert C. Hauke et al.

[57] ABSTRACT

An internal combustion engine having a cylinder with a piston reciprocably movable to alternately compress and expand a main combustion chamber disposed above the piston, and a precombustion chamber communicating with the main combustion chamber. A volume control member carried by the piston projects into and varies the volume of the precombustion chamber to maintain a constant predetermined ratio between the volumes of the main and precombustion chambers during a portion of the reciprocal movement of the piston.

7 Claims, 3 Drawing Figures

PATENTED DEC 11 1973
3,777,724
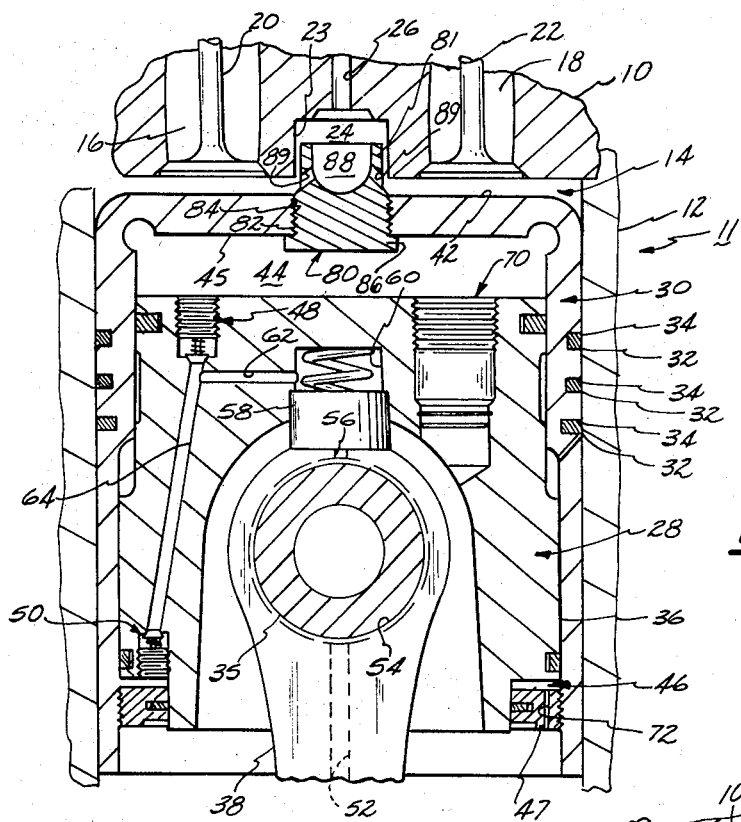
FIG-1
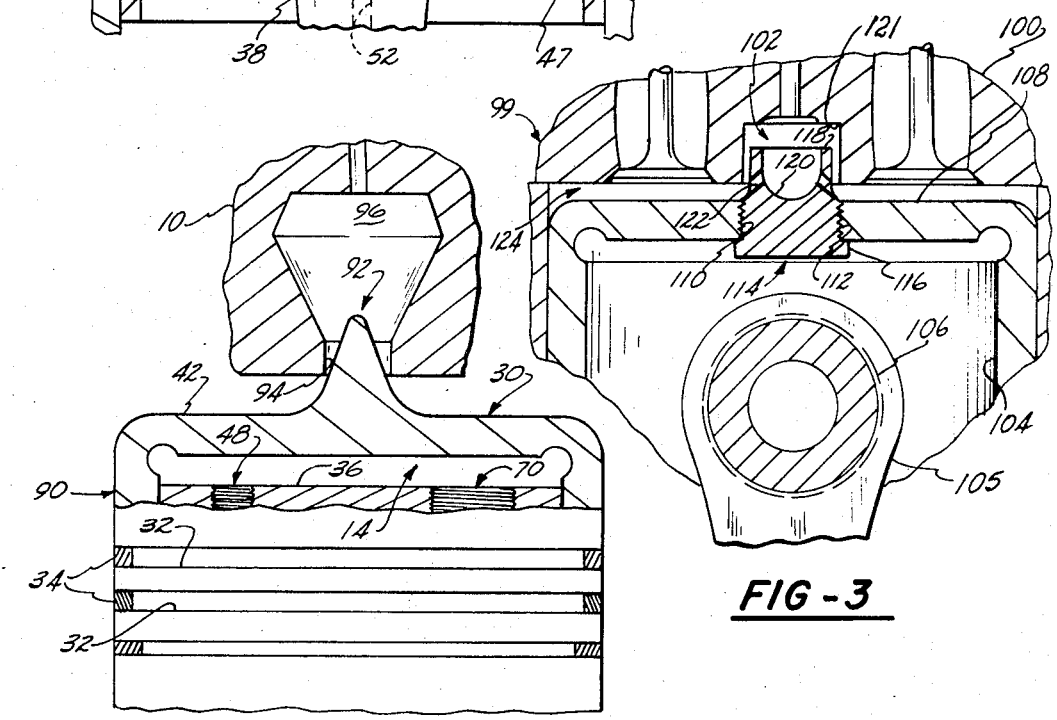
FIG-2
FIG-3
INVENTOR.
LEO R. KILEY
BY

INTERNAL COMBUSTION ENGINE HAVING A VARIABLE VOLUME PRECOMBUSTION CHAMBER

In one embodiment of the invention the piston comprises a two-part variable compression ratio (VCR) piston having upper and lower variable volume chambers adapted to contain an incompressible fluid such as the oil from the lubrication system of the engine. The chambers are interconnected to provide a means for automatically regulating the compression ratio of the engine to maintain a predetermined maximum main combustion chamber pressure by moving the two parts of the variable compression chambers relative to one another. The precombustion chamber volume control member is carried by one of the parts of the VCR piston and varies the volume of the precombustion chamber and/or the rate of flow of the fuel therethrough as the volume of the main combustion chamber is varied by the relative movement of the piston parts.

In a second embodiment the volume control member is carried by a piston of a conventional construction.

BACKGROUND OF THE INVENTION

1. Field of the Invention

The present invention relates generally to internal combustion engines and, more particularly, to an internal combustion engine having a precombustion chamber, the volume of which is maintained at a predetermined proportion of the volume of the main compression chamber as its volume is changed by the reciprocal movement of the piston.

2. Description of the Prior Art

Although the present invention is adapted for use with various kinds of internal combustion engines, particular advantage is realized by utilizing the invention in cooperation with a two-part variable compression ratio piston similar to the type disclosed in U.S. Pat. No. 3,303,831, issued Feb. 14, 1967.

Internal combustion engines of the type in which the present invention has particular use generally have provisions for a precombustion chamber for each cylinder of a conventional internal combustion engine having either a fixed piston or a two-part variable compression ratio (VCR) piston. Precombustion chambers are provided to deliver an ignited fuel mixture to the main combustion chamber to aid in combustion.

It has been found that optimum performance may be obtained in the operation of internal combustion engine when the volume of the precombustion chamber is maintained at some predetermined ratio of the volume of the main combustion chamber.

If a VCR piston is employed in an internal combustion engine, the volume of the main combustion chamber constantly varies throughout the operation engine as there is relative movement between the two parts that make up the VCR piston and thus there will be a constant, incremental change in the volume of the main combustion chamber. Since there is a change in the volume of the main combustion chamber, the use of a precombustion chamber with a VCR type engine is not favored as the aforementioned optimum proportion of the volume of the precombustion chamber to the main combustion chamber cannot be maintained as the volume of the main combustion chamber is variable while the volume of the precombustion chamber is constant.

It would therefore be desirable to provide an internal combustion engine employing a VCR piston with a precombustion chamber whose volume is changed to maintain a predetermined proportion between its volume and the changing volume of the main combustion chamber.

SUMMARY OF THE INVENTION

The present invention, which will be described subsequently in greater detail, comprises an internal combustion engine having a cylinder with a reciprocating piston and a main combustion chamber above the piston, the volume of which is varied as the piston is reciprocated within the cylinder. Means for defining a precombustion chamber communicating with the main combustion chamber cooperate with a volume control means carried by the piston on the combustion chamber side thereof for maintaining the volume of the precombustion chamber at a predetermined proportion of the volume of the main combustion chamber as the volume of the same is changed by the reciprocal movement of the piston.

It is therefore an object of the present invention to provide an improved internal combustion engine construction having a precombustion chamber whose volume is maintained at some predetermined proportion of the volume of the main combustion chamber.

It is also an object of the present invention to provide an internal combustion engine having a precombustion chamber particularly adapted to be utilized in conjunction with a two-part variable compression ratio (VCR) piston having means to control the volume of the precombustion chamber to maintain the same at some predetermined proportion of the volume of the main combustion chamber.

It is also an object of the present invention to provide an internal combustion engine of the type described which can be constructed in a simple and inexpensive manner.

Other objects, advantages, and applications of the present invention will become apparent to those skilled in the art of internal combustion engines when the accompanying description of some examples of the best modes contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views, and in which:

FIG. 1 is a fragmentary cross-sectional view through one embodiment of an internal combustion engine constructed in accordance with the principles of the present invention and illustrating its use with a VCR piston;

FIG. 2 is a similar cross-sectional view of a VCR piston having a modified form of the present invention; and FIG. 3 is a cross-sectional view of a conventional piston incorporating an example of the present invention.

DESCRIPTION OF THE PREFERRED EMBODIMENTS

Referring now to the drawing and, in particular, to FIG. 1 wherein there is illustrated an internal combustion engine 11 comprising a cylinder head 10 and a cylinder member 12 which is closed at its top end by the cylinder head 10 to define a main combustion chamber 14. The cylinder head 10 has a pair of spaced openings 16 and 18 which extend through the cylinder head 10 to communicate with the main combustion chamber 14. The openings 16 and 18 are adapted to accommodate a rocker arm actuated exahusted port valve 20 and an intake port valve 22 of a conventional construction. Since the exhaust and intake port valves and the rocker arm (not shown) are all of a conventional construction, a further detailed description thereof is not deemed necessary.

The cylinder head 10 is further provided with an enlarged cylindrically shaped recess 23 that defines a precombustion chamber 24. The upper portion of the precombustion chamber 24 has an inlet nozzle 26 communicating the precombustion chamber 24 with a source of combustible fuel, while a second opening (not shown) has ignition means, such as a spark plug, normally extending into the precombustion chamber 24 adjacent the nozzle 26 to ignite the fuel admitted therethrough into the precombustion chamber 24.

In FIG. 1 a variable compression ratio (VCR) piston 28 is mounted for reciprocation in the cylinder member 12 and consists of two main parts: a piston shell 30 (outer member) grooved at 32 to carry piston rings 34, and a piston pin carrier 36 (inner member). The carrier 36 is linked to the crankshaft (not shown) of the internal combustion engine 11 by a connecting rod 38 and a piston pin 35 and always moves between fixed upper and lower limits, whereas the piston shell 30 is free to move within certain limits relative to the carrier 36. This relative movement provides a variable height from the center of the piston pin 35 to the top of the piston crown 42, thus effecting a variation of the compression ratio through a change in the clearance volume in the cylinder of the engine without a change in engine displacement, all of which is well known and conventional in construction.

The movement of the piston shell 30 is restrained hydraulically by oil contained within an upper chamber 44 formed between inner surface 45 of the crown 42 and the top of the carrier 36 and by oil contained in an annular lower chamber 46 formed between the carrier 36 and a ring 47 carried by the piston shell 30. The relative position of the piston shell 30 and the carrier 36 with respect to each other is determined by the quantity of oil in, and thus the volumes of, the upper and lower chambers 44 and 46.

The chambers 44 and 46 are filled with lubricating oil supplied through non-return inlet check valves 48 and 50. Oil from the engine lubrication system of the engine is fed to the valves 48 and 50 by a series of interconnected passageways comprising a bore 52 in the rod 38, a groove 54 encircling the pin 35, an outlet 56 at the top of the rod 38, a spring loaded slipper collector 58 in the piston carrier 36, a spring chamber 60, and passages 62 and 64 within the carrier 36. Oil is discharged from the upper chamber 44 when it exceeds a predetermined pressure therein by means of a preset spring loaded discharge valve 70, all of which are described in greater detail in the aforementioned U.S. Pat. No. 3,303,831. During compression and firing, the discharge valve 70 limits the maximum allowable pressure in the upper chamber 44 which, in turn, assures that the engine peak firing pressure does not exceed a predetermined maximum pressure.

Oil may be controllably discharged from the lower chamber 46 through a fixed orifice 72 in the ring 47 to thereby control the amount of relative movement between the piston shell 30 and the carrier 36 on the exhaust intake stroke. Oil discharged from orifice 72 and relief valve 70 returns directly to the crankcase of the engine. It should be noted that as oil is bled from the orifice 72 to thereby permit a decrease in the volume of the lower chamber 46, the volume of the upper chamber 44 increases and is filled with oil from inlet valve 48. Conversely, when oil is bled from the relief valve 70 to permit a decrease in the volume of the upper chamber 44, the volume of the lower chamber 46 increases and is filled with oil from the inlet valve 50.

During the latter part of each upward stroke of the VCR piston 28 and the early part of each downward stroke, the inertia of the oil in the connecting rod 38 acting upwardly creates a pressure in the passageways 62 and 64. This pressure tends to open the inlet valves 48 and 50 and pumps oil into the upper and lower chambers 44 and 46. At the same time the inertia of the piston shell 30, also acting upwardly, tends to raise the piston shell 30 relative to the carrier 36. During the compression and power strokes this tendency is less than the tendency for opposite motion caused by the gas pressure acting on the piston crown 42. During the compression and power strokes, the gas pressure acting on the piston crown 42 is transmitted to the carrier 36 through the oil in the upper chamber 44 creating a high oil pressure in the chamber 44. Whenever the gas pressure exceeds a selected upper limit, sufficient oil pressure is built up in the upper chamber to open the discharge valve 70 and release some of the oil allowing the shell 30 to move downwardly relative to the carrier 36, thus decreasing the compression ratio of the engine 11. Thus as the piston is in a compression stroke approaching the cylinder head, the volume of the main combustion chamber 14 will vary because of the aforementioned relative movement between the piston shell 30 and carrier 36.

In order to maintain a predetermined ratio of the volume of the precombustion chamber 24 with the changing volume of the main combustion chamber 14, a volume control member 80 is employed and ocmprise a cylindrically shaped member 81 having a threaded portion 82 engaging a threaded aperture 84 in the crown 42. The uppermost projection of the member 80 is limited by the abutment of a radially enlarged head 86 with the bottom wall 45 of the crown 42. The volume control member 80 has recess 88 which forms a part of the precombustion chamber 24 when the piston is at the end of a compression stroke and the volume control member 80 is received within the cylindrically shaped recess 23. A plurality of inclined, arcuately spaced through bores 89 connect the recess 88 with the main combustion chamber 14 so that the ignited combustion fuel within the precombustion chamber 24 is transmitted to the main combustion chamber 14 to ignite the combustion fuel therein and bring the piston 28 to a power stroke. Since the volume control member 80 is carried by the moving piston shell 30, it will automatically adjust the volume of the precombustion chamber 24 in accordance with any change in volume of the main combustion chamber 14, thereby maintaining a predetermined ratio between the volumes of the main and precombustion chambers during ignition of the fuel. It can be seen that if the piston shell 30 and the carrier 36 move toward one another to increase the volume of the main combustion chamber 14, the volume of the precombustion chamber 24 is similarly proportionately increased and vice versa.

Referring now to FIG. 2 there is illustrated a VCR piston 90 which is substantially identical to the VCR piston 28 hereinbefore described except that the volume control member 80 is replaced by volume control member 92 comprising an integrally formed conically shaped projection centrally disposed at the top of the crown 42 of the shell 30. The volume control member 92 is adapted to extend into a cylindrically shaped throat 94 of a precombustion chamber 96 in the cylinder head 10 at the end of the engine compression stroke to vary the volume of the precombustion chamber 96 as well as the size of the cross-sectional area communicating the precombustion chamber 96 with the main combustion chamber 14 in proportion to the volume of the main combustion chamber 14. Thus, as the volume of main combustion chamber 14 decreases, both the volume of the precombustion chamber 96 and the effective cross-sectional flow area of the throat 94 are similarly decreased as a larger cross-sectional portion of the conically shaped member 92 extends further into the throat 94. Conversely, when the volume of the main combustion chamber 14 increases, there will be a corresponding increase in both the volume of the precombustion chamber 96 and the effective flow area of the throat 94 as the volume control member 92 will project a lesser amount into the throat 94.

Referring now to FIG. 3 there is illustrated a fragmentary view of an internal combustion engine 99 having a cylinder head 100 with a cylindrically shaped precombustion chamber 102 and a conventional piston 104 linked to the crankshaft (not shown) of an engine 11 by a connecting rod 105 and piston pin 106 such that the piston crown 108 always moves between fixed upper and lower limits as opposed to the aforementioned VCR pistons 28 and 90 which have a relative and limited movement between the piston shell and piston carrier. The crown 108 of the piston 104 has a threaded aperture 110 which is threadedly engaged by the threaded portion 112 of a volume control member 114. The uppermost projection of the volume control member 114 is limited by the abutment of a radially enlarged head 116 with the bottom wall of the crown 108. The volume control member 114, which is substantially identical to the volume control member 80 hereinbefore described, comprises a cylindrically shaped member 118 having a recess 120 which, when the piston 104 is at the end of a compression stroke and the volume control member 114 is received within a recess 121 in the head 100, defines the lower portion of the precombustion chamber 102. Similarly, a plurality of inclined, arcuately spaced through bores 122 communicate the recess 120 and thus the precombustion chamber 102 with the main combustion chamber 124 to ignite combustion fuel therein and bring the piston 104 to a power stroke.

In the embodiment illustrated in FIG. 3, the volume control member 114 can be preadjusted to obtain an optimum proportion between the volumes of precombustion chamber 102 and the main combustion chamber 124 by testing the engine with the volume control member 114 located at several selected projected positions. By assembling and testing the engine with the member 114 disposed in preselected positions, the performance characteristics of the engine may be compared to reveal the optimum volume of the precombustion chamber 102 as compared to the volume of the main combustion chamber 124. The engine can then be provided with the volume control members 114 in the optimum position. Thus a very simple means is disclosed for providing the optimum ratio of the volume of the precombustion chamber to the main combustion chamber volume of an engine utilizing a conventional piston such as the piston 104.

It has been found that the optimum volume of the precombustion chamber is approximately 28% of the volume of the main combustion chamber at ignition; it being noted that smaller engines require a slightly larger precombustion volume as compared to the volume of the main combustion chamber, while larger engines require a smaller precombustion volumes as compared to the volume of the main combustion chamber.

It can thus be seen that the present invention has provided a new and improved internal combustion engine having a precombustion chamber, the volume of which can be varied in proportion to the variations in the volume of the main combustion chamber.

Although several embodiments of the present invention have been disclosed, it is to be understood by those skilled in the art of internal combustion engines that other forms may be had all coming within the spirit of the invention and the scope of the appended claims.

What is claimed is as follows:

1. An internal combustion engine comprising a cylinder containing a reciprocating piston, a main combustion chamber above said piston, means defining a precombustion chamber communicating with said main combustion chamber, and means carried by said piston on the combustion chamber side thereof projecting into said precombustion chamber for maintaining the volume of said precombustion chamber and the volume of said main combustion chamber at a predetermined ratio when the fuel in said precombustion chamber is ignited, wherein said piston has first and second parts movable relative to one another in response to the reciprocation of the piston within the main combustion chamber of the engine and having a pressure fluid chamber within said piston which varies the internal volume thereof in response to variations in the quanity of fluid pressure therewithin, the volume of said main combustion chamber varying in accordance with the relative movement of said first and second members, said means carried by said piston on the pressure side thereof being carried by one of said piston members and extending into said precombustion chamber to vary the volume of said precombustion chamber to maintain a predetermined ratio between said volumes of said precombustion chamber and said main combustion chamber as the volume of said main combustion chamber is varied by the relative movement of said first and second piston members.

2. An internal combustion engine comprising a cylinder containing a reciprocating piston; a main combustion chamber above said piston; means defining a precombustion chamber communicating with said main combustion chamber, a precombustion chamber volume control member adjustably mounted to said piston to provide a means for selectively varying the volume of said precombustion chamber to provide an optimum ratio between the volume of the main combustion chamber and the precombustion chamber; said piston having a threaded aperture provided in axial alignment with said main combustion chamber, said volume control member having a threaded outer surface and being adjustably mounted in said threaded aperture to extend into said precombustion chamber at top dead center position of said piston, said volume control member having an upper concave surface forming a portion of said precombustion chamber when said volume control member is disposed within said precombustion chamber and bores communicating said surface with said main combustion chamber whereby said precombustion chamber is communicated with said main combustion chamber through said bores.

3. The internal combustion engine defined in claim 1 wherein said means carried by said piston on the combustion chamber side thereof comprises an aperture in said one of said piston members, a volume control member extending through said one piston member and secured thereto, said volume control member being in alignment with said precombustion chamber and movable therein to vary the volume of said precombustion chamber as said piston moves toward said precombustion chamber.

4. The internal combustion engine defined in claim 3 wherein said aperture has a threaded surface and said volume control member has a threaded surface adapted to threadedly engage said aperture threaded surface to secure said member thereto.

5. The internal combustion engine defined in claim 3 wherein said volume control member has an aperture at its projecting end and bore means communicating said aperture with the lower outer peripheral surface of said member to provide communication between said precombustion chamber and said main combustion chamber when said volume control member is extended into said precombustion chamber.

6. The internal combustion engine defined in claim 1 further comprising a passage of a predetermined contour communicating said precombustion chamber with said main combustion chamber, said volume control member having a conical shape with the cross sectional area of said conically shaped member decreasing toward its projecting end and adapted to cooperate with said passage of said precombustion chamber to respectively increase and decrease the effective cross-sectional flow area of said passage as said main combustion chamber increases and decreases in volume.

7. The internal combustion engine defined in claim 6 wherein said projection is an integral portion of said piston.

* * * * *

UNITED STATES PATENT OFFICE
CERTIFICATE OF CORRECTION

Patent No. 3,777,724      Dated December 11, 1973

Inventor(s) Leo R. Kiley

It is certified that error appears in the above-identified patent and that said Letters Patent are hereby corrected as shown below:

Column 3, line 6, after "valves" insert --20 and 22--.

Column 4, line 3, delete "relief" and insert --discharge--;

line 4, after "engine", insert --11--;
line 8, delete "relief" and insert -- discharge --;
line 34, after "piston", insert --28--;

line 43, delete "ocmprises" and insert --comprises-- line 48, delete "bottom wall" and insert --inner surface--;

line 64, after "chambers", insert --14 and 24--;

Column 5, line 64, after "engine", insert --99--;

Column 6, line 2, after "engine", insert --99--;

line 6, after "chamber", insert --102--;

line 7, after "chamber", insert --124--.

Signed and sealed this 21st day of May 1974.

(SEAL)
Attest:

EDWARD M. FLETCHER, JR.
Attesting Officer

C. MARSHALL DANN
Commissioner of Patents